United States Patent
Kumar et al.

(10) Patent No.: US 9,295,032 B2
(45) Date of Patent: Mar. 22, 2016

(54) SECURE AIRCRAFT DATA TRANSMISSION USING MULTIPLE COMMUNICATION CHANNELS

(71) Applicant: The Boeing Company, Chicago, IL (US)

(72) Inventors: Anil Kumar, Sammamish, WA (US); Arun Ayyagari, Seattle, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 14/166,708

(22) Filed: Jan. 28, 2014

(65) Prior Publication Data
US 2015/0215899 A1     Jul. 30, 2015

(51) Int. Cl.
| | |
|---|---|
| *H04W 76/02* | (2009.01) |
| *H04W 72/02* | (2009.01) |
| *H04W 12/08* | (2009.01) |
| *H04L 29/06* | (2006.01) |
| *H04L 29/08* | (2006.01) |

(52) U.S. Cl.
CPC .............. *H04W 72/02* (2013.01); *H04L 63/105* (2013.01); *H04L 63/205* (2013.01); *H04L 67/12* (2013.01); *H04L 69/14* (2013.01); *H04W 12/08* (2013.01)

(58) Field of Classification Search
CPC ..... H04W 76/02; H04W 72/04; H04W 28/16; H04W 84/042; H04W 16/14
USPC ........ 455/450, 452.1, 451, 431, 456.1, 456.3, 455/464
See application file for complete search history.

(56) References Cited

U.S. PATENT DOCUMENTS

| | | | |
|---|---|---|---|
| 6,995,658 B2 | 2/2006 | Tustison et al. | |
| 7,893,557 B2 | 2/2011 | Davis et al. | |
| 2003/0093187 A1* | 5/2003 | Walker | 701/1 |
| 2005/0154653 A1* | 7/2005 | Jongebloed | 705/28 |
| 2006/0046715 A1* | 3/2006 | Burgemeister | 455/431 |
| 2008/0037461 A1* | 2/2008 | Biltz et al. | 370/328 |
| 2008/0219671 A1* | 9/2008 | Schmitt | 398/130 |
| 2012/0099627 A1 | 4/2012 | Mitchell et al. | |
| 2013/0003756 A1 | 1/2013 | Mitchell et al. | |
| 2014/0075506 A1* | 3/2014 | Davis et al. | 726/3 |

OTHER PUBLICATIONS

"European Application Serial No. 15152534.2, Search Report mailed Jun. 19, 2015", 7 pgs.
Sampigethaya, Krishna et al., "Enhancing the Last Mile Communications at Airports", 28th International Congress of Aeronautical Sciences, Sep. 2012, 10 pgs.

* cited by examiner

*Primary Examiner* — Minh D Dao
(74) *Attorney, Agent, or Firm* — Kwan & Olynick LLP

(57) ABSTRACT

Provided are methods and systems for terrestrial data transmission between aircraft and external networks, such as airline networks and/or airport networks. While an aircraft is landed, various data domains may need to be transmitted between the aircraft and such networks using two or more communication channels available to the aircraft. These channels may include wired and/or wireless channels, such as broadband over power line channels, Ethernet channels, Wi-Fi channels, and cellular channels. The available communication channels are allocated to transmit particular data domains based on the security levels of these channels. For example, aircraft control domains may be transmitted using a more secure communication channel than passenger information domains and/or entertainment systems domains. In some embodiments, multiple communication channels may be used to transmit the same domain parsed into multiple transmission packets. The packets are recombined back into the data domain after the transmission.

17 Claims, 6 Drawing Sheets

SECURE AIRCRAFT DATA TRANSMISSION USING MULTIPLE COMMUNICATION CHANNELS

BACKGROUND

The amount of data stored, collected, and used by various onboard computer systems of a typical aircraft is growing at a rapid pace. For example, the onboard systems utilize data for various cabin systems, avionics systems, and inflight entertainment systems. Operational and maintenance data including aircraft condition monitoring function (ACMF) and engine performance data may be generated during the flight and needed to be shared with other systems. Airlines are generally responsible for updating the data and software configuration items on their aircraft (for flight operations and passenger entertainment) and timely downloading from the aircraft (pertaining to maintenance and system performance logs). For example, data collected during one or more previous flights may need to be transmitted to an external network used by an airline. All these activities require fast and secure data transmissions between aircraft and external networks while the aircraft are on the ground, for example, at an airport gate in between flights. While data transmissions may be performed using a variety of airport Wi-Fi or cellular communication channels, availability of these channels may be limited at many airports. Furthermore, the security of these channels may not be adequate for some data types and locations.

SUMMARY

Provided are methods and systems for terrestrial data transmission between aircraft and external networks, such as airline networks and/or airport networks. While an aircraft is on the ground or near the ground, such as within a zone of one or more communication channels, various data from aircraft domains may need to be transmitted between the aircraft and such networks using two or more communication channels available to the aircraft. These channels may include broadband over power line channels, wired Ethernet channels, and wireless channels, such as Wi-Fi, Wi-Gig, cellular, and satellite communication channels. The available communication channels are allocated to transmit particular data domains based on the security levels of these channels. For example, the aircraft control domain may be transmitted using a more secure communication channel than the passenger information domain and/or entertainment systems domain. The security threshold for each data domain may be set based on data type of this domain, airline requirements, global cyber security alerts, geographical location, and other like factors. In some embodiments, multiple communication channels may be used to transmit the same domain, which parsed into multiple transmission packets. The packets are recombined back into the data domain after the transmission. The data domain parsing and the allocation of the parsed transmission packets to specific communication channels may be performed to achieve the overall data transmission rates and security levels for each data domain. In some embodiments, the same packet may be transmitted multiple times using different communication channels, which may be also referred to as a replication transmission or transmission using redundant paths. At the receiving points, one of the redundant packets may be selected for recombination into data domains.

In some embodiments, a method for terrestrial data transmission between an aircraft and an external network involves identifying two or more communication channels available for terrestrial data transmission between the aircraft and the external network. The method also involves allocating data domains to be transmitted between the aircraft and the external network to each of these two or more communication channels. The data domains may be allocated based on the channel security level of each channel. For example, each data domain may have a certain minimum requirement for channel security. These requirements may vary for different data domains. In some embodiments, the communication channel allocated to transmit a particular domain may meet or exceed the requirement for channel security for that particular data domain.

In some embodiments, the method also involves determining the security level of each available channel. For example, the security level may be determined based on the geographical location of this particular channel, type of the channel, previous security breaches associated with this location or channel, global cyber security alerts configuration of external networks, and other like factors. In some embodiments, certain channels may be deemed unavailable for any terrestrial data transmission between the aircraft and the external network based on their security level determined during this operation.

In some embodiments, at least two of the two or more communication channels available for data transmission are different types. For example, one channel may be a broadband over power line channel, while another channel may be a wireless channel. In some embodiments, both channels may be wireless channels. For example, one channel may be a Wi-Fi channel, while another one may be a cellular channel. In some embodiments, multiple broadband over power line channels and/or multiple wireless channels may be available for terrestrial data transmission between the aircraft and the external network. Overall, the two or more available communication channels may include at least one of a broadband over power line communication channel, a Wi-Fi communication channel, a cellular communication channel, or an Ethernet communication channel. In general, available communication channels may be categorized as wired and wireless communication channels.

In some embodiments, the method also involves transmitting the data domains between the aircraft and the external network using the allocated communication channels. The data domains may be transmitted from the aircraft to the external network and/or from the external network to the aircraft. Each data domain may be transmitted at least partially through one allocated communication channel. In some embodiments, at least one data domain is transmitted entirely through the same communication channel. Alternatively, a data domain may be parsed into transmission packets, and some of these packets may be transmitted through one communication channel, while other packets may be transmitted thorough another communication channel.

Specifically, in some embodiments, at least one available channel is allocated to transmit an entire data domain. Alternatively, at least two available communication channels may be allocated to transmit the same data. In the latter case, the method may also involve generating instructions for reconstructing the same data domain after the same data domain is transmitted using multiple communication channels.

In some embodiments, allocating each one of the two or more available communication channels to the data domains may also be based on one or more parameters in addition to the channel security level. These additional parameters may include transmission cost of each available communication channel, transmission speed of each available communication channel, and available duration of each available communication channel. In some embodiments, the allocating operation is performed automatically. Furthermore, the identifying and allocating operations may be performed by a communication channel manager disposed on the aircraft.

The data domains may include an aircraft control domain, an aircraft information system domain, and a passenger information and entertainment systems domain. These domains may have different security levels and, as such, need to be transmitted using different communication channels. For example, the aircraft control domain may have the highest security level among the three, followed by the aircraft information system domain, and the passenger information and entertainment systems domain being the least secure domain.

In some embodiments, at least one of the two or more available communication channels has a different channel security level than at least another one of these channels. For example, the broadband over power line communication channel may have a higher channel security level than a wireless communication channel. These channel security levels are used to allocate different data domains to these channels.

In some embodiments, the method also involves determining transmission characteristics of each data domain to be transmitted. The transmission characteristics may include a data security level or a data type. As noted above, the aircraft control domain may have the highest security level, while the passenger information and entertainment systems domain may have the lowest security level.

Provided also is a system for terrestrial data transmission between an aircraft and an external network. The system involves a broadband over power line module configured to transmit data to and from the external network through an electrical power cable connected to the aircraft and a gate. The system may also include at least one wireless communication module configured to wirelessly transmit data to and from the external network. The system also includes a communication channel manager configured to initiate and control data transmission between the broadband over power line module and the external network and between the at least one wireless communication module and the external network. The communication channel manager may be also configured to identify two or more communication channels established by the broadband over power line module and the at least one wireless communication module. These two or more communication channels may be used for terrestrial data transmission between the aircraft and the external network. The communication channel manager may be configured to allocate each of the two or more communication channels to data domains to be transmitted between the aircraft and the external network based on a channel security level of each communication channel. The broadband over power line module, the wireless communication module, and the communication channel manager are configured for fixed attaching to the aircraft.

In some embodiments, the broadband over power line module, the wireless communication module, and the communication channel manager are integrated into a terrestrial off-board communication unit. The system may also include an aircraft to which the broadband over power line module, the wireless communication module, and the communication channel manager are fixedly attached to. The aircraft may include an electrical power receptacle for connecting to the electrical power cable. The electrical power receptacle is inductively coupled to the broadband over power line.

Provided also is a computer program product including a computer usable medium having a computer readable program code embodied therein. The computer readable program code is adapted to be executed to implement a method for terrestrial data transmission between aircraft and external networks. The method includes identifying two or more communication channels available for terrestrial data transmission between the aircraft and the external network and allocating each of the two or more communication channels to data domains to be transmitted between the aircraft and the external network based on a channel security level of each of the two or more communication channels.

These and other embodiments are described further below with reference to the figures.

DETAILED DESCRIPTION OF EXAMPLE EMBODIMENTS

Figure 1:
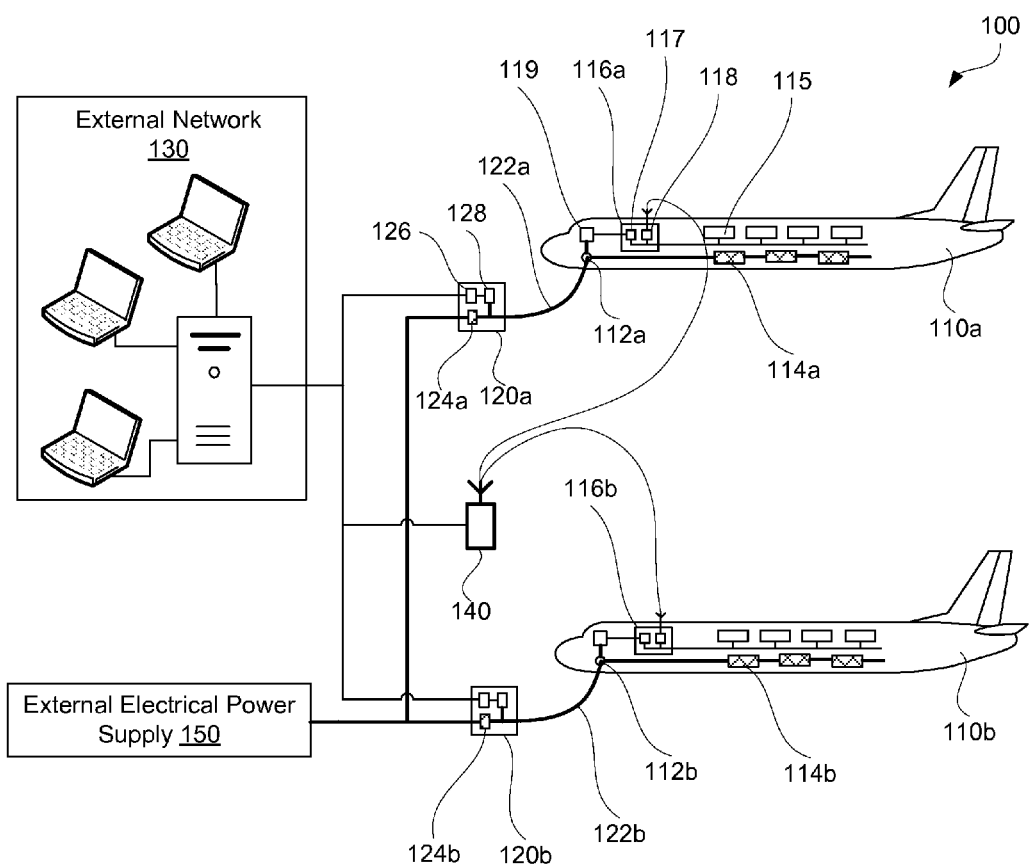
FIG. 1 is a schematic representation of a system for terrestrial data transmission between an aircraft and an external network, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Data transmission between aircraft and external networks, such as airport networks, airline networks, and other types of terrestrial networks, is essential in modern aviation. Data collected during prior flights may need to be downloaded from an aircraft for processing, while new data needs may need to be uploaded for future flights. Often the ground time of an aircraft is limited, while significant amounts of data need to be transmitted to and from the aircraft in an efficient, secure, and robust manner. Various wireless and wires communication channels have been proposed and partially adopted by various airports and airlines. Examples of wireless communication channels include Wi-Fi and cellular channels, while examples of wired communication channels include broadband over power line and Ethernet channels. Often multiple different communication channels having different security levels are available to the same aircraft. Furthermore, data domains that need to be transmitted between the aircraft and external network have different security requirements for their transmission.

Provided are methods and systems for terrestrial data transmission between aircraft and external networks in which data domains are allocated to communication channels based on security level of these channels. For example, the data domains to be transmitted between the aircraft and the external network may include an aircraft data domain, an aircraft information systems domain, and a passenger information and entertainment systems domain. The aircraft data domain may have the highest security requirements, while the passenger information and entertainment systems domain may have the lowest security requirements among these three domains. Availability of two or more communication channels present various options to transmit these domains between the aircraft and the external network in the adequately secure manner. For example, when two communication channels have different security levels, the most secure channel may be used for transmission of the aircraft data domain, while the less secure channel may be used for transmission of the passenger information and entertainment systems domain. In some embodiments, a portion of the aircraft data domain may be transmitted using one channel and the remaining portion may be transmitted using another channel. In this case, if one channel is compromised by an attacker, the aircraft data domain will not be fully available to the attacker. The chances of compromising multiple communication channels or, more specifically, all communication channels by the same attacker that may be available to the aircraft for data transmission may be substantially less than chances of compromising each individual channel by itself. In particular, the chances of compromising multiple communication channels, which are different types (e.g., a combination of a broadband over power line communication channel and a cellular communication channel) may be even less. Furthermore, each communication channel may use its own authentication method and/or encryption method different from other channels. Even if one such method is compromised, the full data domain will still not be accessible unless all methods are compromised at the same time.

Examples of Data Transmission Systems

A brief description of a data transmission system will now be presented to illustrate various components and security features. FIG. 1 is a schematic illustration of a system 100 for terrestrial data transmission between an aircraft and an external network, in accordance with some embodiments. Illustrated are aircraft 110a and 110b communicatively coupled to an external network 120 using various components of system 100. One having ordinary skills in the art would understand that any number of aircraft (e.g., one, two, three, or more) may be communicatively coupled to the same or different external networks using the same system. Furthermore, while the reference is made to cellular and broadband over power line communication channels, one having ordinary skills in the art that this description can be extended to any other types of communication channels. In general, two or more communication channels need to be available for terrestrial data transmission between the aircraft and the external network.

Aircraft 110a and 110b are shown parked at their respective gates 120a and 120b and connected to gates 120a and 120b to receive electrical power. Specifically, aircraft 110a is shown to be connected to gate 120a using an electrical power cable 122a, while aircraft 110b is shown to be connected to gate 120b using an electrical power cable 122b. Aircraft 110a and 110b may have electrical receptacles 112a and 112b for making connections to electrical power cables 122a and 122b. Electrical power cables 112a and 122b may be standardized power cables suitable for different aircraft types. Gate 120a and gate 120b may receive their power from external power supply 150.

Each aircraft is equipped with two or more communication modules, which may or may not be integrated into a terrestrial off-board communication unit (TOCU). FIG. 1 illustrates TOCU 116a on board of aircraft 110a and TOCU 116b on board of aircraft 110b. Examples of communication modules include broadband over power line communication modules, Wi-Fi modules, cellular modules, and/or Ethernet modules. In the example illustrated in FIG. 1, aircraft 110a has aircraft broadband over power line module 117 and cellular module 118. Cellular module 118 may establish a cellular communication channel with a data service provider 140. Aircraft broadband over power line module 117 may establish a broadband over power line communication channel with gate broadband over power line module 126. In some embodiments, aircraft 110a may include additional communication module, such as Wi-Fi modules and Ethernet modules.

Specifically, cellular module 118 may be used to connect to data service provider 140 that provides further connection to external network 130. Internet and/or other types of networks may be used for data transmission between data service provider 140 and external network 130. Data service provider 140 may be a part of the airport infrastructure, e.g., Gatelink, or independent data provider, e.g., a cell phone company. It should be noted that in the case of wireless service, the communication channel and data transmission may occur even when aircraft 110a is not parked at the gate. This communication channel may be, for example, used for urgent information while aircraft 110a is still directed to gate 120a after landing or after aircraft 110a left gate 120a.

Broadband over power line module 117 is used for data transmission through electrical power cable 122a. Specifically, broadband over power line module 117 is connected to electrical power cable 122a through an interface card 119 configured to separate data signals from electrical power cable 122a. Interface card 119 may utilize inductive coupling or capacitive coupling. As such, interface card 119 is also exposed to a voltage and frequency used for the electrical power transmission. In some embodiments, an interface card is integrated into broadband over power line module 117.

Gate 120a, to which aircraft 110a is connected by electrical power cable 122a, also includes a broadband over power line module 126 or, more specifically, gate broadband over power line module 126. In some embodiments, gate broadband over power line module 126 may not be a part of gate 120a, in particular, when the electrical power is not being converted (frequency, voltage) at gate 120a. In this case, the data signal may propagate past gate 120a without a need for any additional equipment, such as repeaters, at gate 120a. However, because of very specific characteristics of power supplied to aircraft 110a, power conversion is still performed within the bounds of the airport. As such, the data signal travels only within the restricted territory of the airport and cannot be easily accessed.

Gate broadband over power line module 126 may be connected to external network 130 and capable of exchanging data with other devices and systems that are connected or parts of this network. For example, external network 130 may be a controlled network within the airport or a part of the Internet. Various connection schemes and technologies may be used for this part of data exchange, i.e., between gate broadband over power line module 126 and external network 130. For example, gate 120a may include other communication modules, such as an Ethernet module, a Wi-Fi module, and/or a cellular module for connecting to external network 130 as further described below with reference to FIG. 3. The gate communication modules should be distinguished from aircraft communications modules even though they may have similar types. For example, both aircraft 110a and gate 120a may have cellular modules for connecting to external network 130. Likewise, both aircraft 110a and gate 120a may have Wi-Fi modules for connecting to external network 130. Both aircraft 110a and gate 120a may have Ethernet modules for connecting to external network 130. Gate 120a may also include an interface card 128 for connecting gate broadband over power line module 126 to power cable 122a. In some embodiments, interface card 128 is integrated into gate broadband over power line module 126.

In some embodiments, the broadband over power line communication channels may be more secure data transmission than other available communication channels. Specifically, data signals transmitted through the broadband over power line are restricted to electrical power cables 122a and 122b and a few other power supply components that operate at certain frequency. All of these components are physically located within airport areas having restricted access. Other power lines extending through the airport and operating at a different voltage and/or at a different frequency than electrical power cables 122a and 122b will not carry the data signal. Any power lines used for an upstream supply of power to electrical power cables 122a and 122b may be effectively shielded from the data signals by virtue of using different frequencies and/or voltages. In other words, the data signals are blocked by frequency converters, transformers, and other like components. As such, the data signals are effectively contained within a small portion of power lines used in the airports. Security within broadband over power line module channels may be further enhanced by encryption and other like technologies.

Furthermore, physical access to gate broadband over power line module 126 and/or cables 122a may be restricted. The physical access may be restricted by secure enclosures that require successful authentication, via credentials, multi-factor crew authentication, digital keys, passcodes, RFID, biometrics, etc., to gain physical access to these modules and cables. In some embodiments, gate broadband over power line module 126 and/or cable 122a may include GPS receivers for verifying that module 126 and cable 112a have not been moved from a pre-determined position. Furthermore, gate broadband over power line module 126 may be configured with a secure routing table that facilitates routing information via external network 130 using pre-determined hops and/or pre-determined destinations. Gate broadband over power line modules 126 may be identified and/or addressed by a hardware identifier such as a MAC address. In some embodiments, gate broadband over power line module 126 may include various computer system components, such as output devices and ports (e.g., a display), input devices (e.g., a keyboard, touch screen, mouse), a memory (e.g., tangible computer readable memory). Furthermore, gate broadband over power line module 126 may include a communication channel manager for selecting a communication channel between each of gate broadband over power line module 126 and external network 130.

Various servers may be a part of or connected to external network 130, such as airline servers, airport servers, aircraft service provider servers, aircraft manufacturer servers, and the like. These servers may be connected to external network 130 via a LAN, WAN, and/or the Internet. These servers may be configured to provide and receive data to and from aircraft 110a and 110b. For example, the servers may provide software and/or firmware updates to components of aircraft 110a and 110b, such as cabin systems software, flight bag, and avionics software. The servers may also provide content, such as music and movies, for in-flight entertainment systems on aircraft 110a and 110b. External network 130 may also provide communication between aircraft 110a and 110b.

Examples of Different Communication Channels

As noted above, two or more different communication channels may be available for data transmission between an aircraft and an external network. In some embodiments, these multiple channels may be available directly from the aircraft as, for example, shown in FIG. 2. In this case, communication modules supporting these different communication channels are available on the aircraft. Alternatively, the aircraft may use a single communication channel to connect to an intermediate system (e.g., a system provided at the gate). The intermediate system in turn uses multiple channels for communication with the external network as, for example, shown in FIG. 3. The intermediate system may be available on the ground and connected to the aircraft when the aircraft is physically near this system. The intermediate system may be specifically tailored to the communication channels available at this location (e.g., at this airport). Each of these examples will now be described in more detail.

Figure 2:
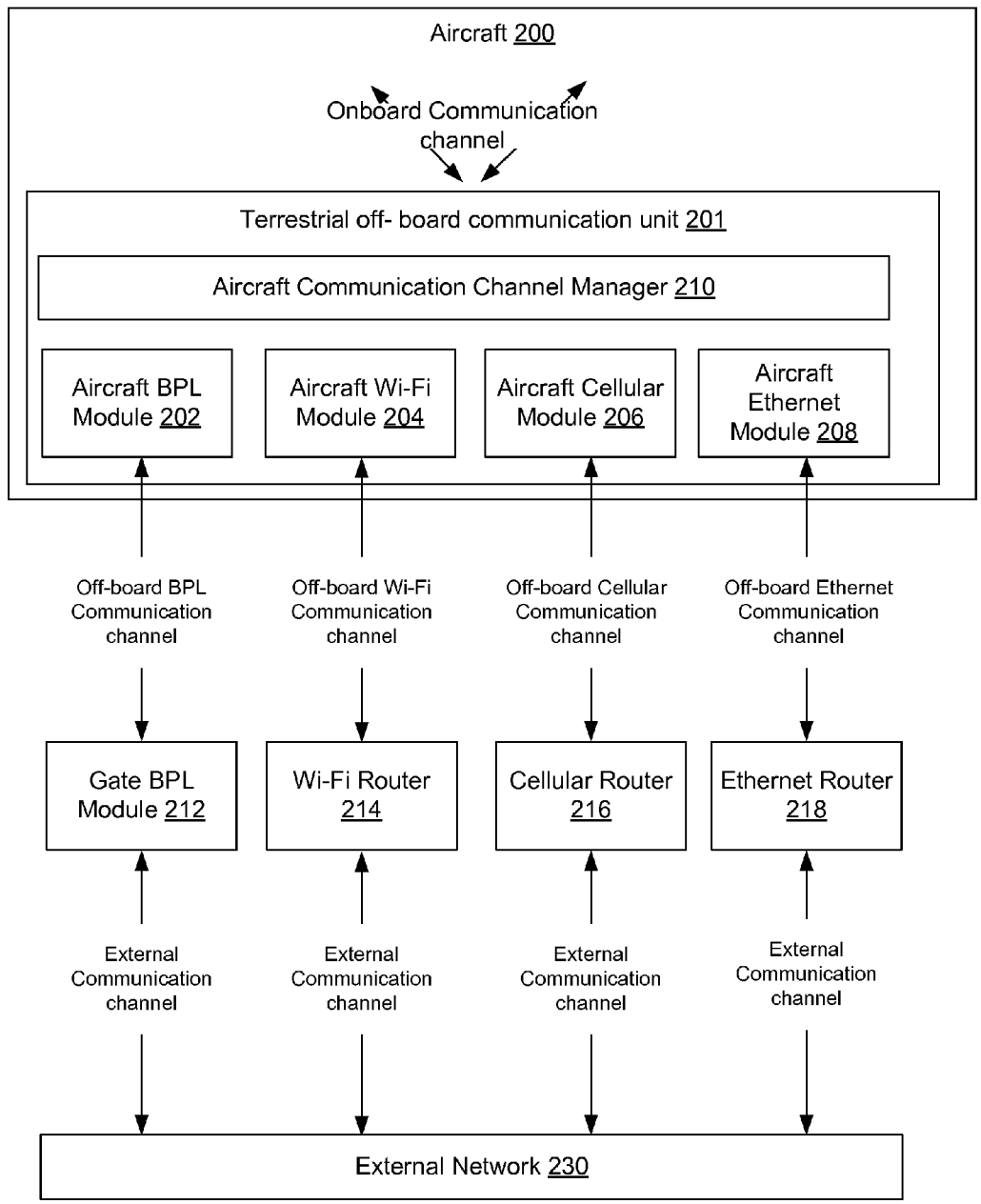
FIG. 2 is a schematic representation of different communications channels for data transmission between an aircraft and an external network, in accordance with some embodiments.

FIG. 2 is a schematic representation of different communications channels for data transmission between an aircraft 200 and an external network 230, in accordance with some embodiments. Aircraft 200 includes at least two communication modules, such as aircraft broadband over power line module 202, an aircraft Wi-Fi module 204, an aircraft cellular module 206, and/or an aircraft Ethernet module 208. In some embodiments, the same module may be used to establish multiple communication channels. For example, a broadband over power line module may establish two or more communication channels through different phase lines of the same power cable. Likewise, a cellular module may establish multiple communication channels with the same or different cellular routers.

Communication modules 202-208 are shown integrated into a terrestrial off-board communication unit 201. In some embodiments, one or more (e.g., all) of these modules may not be integrated with other modules and may function as a part of a standalone system. Aircraft 200 or, more specifically, terrestrial off-board communication unit 201 may also include an aircraft communication channel manager 210, which is configured to initiate and control data transmission between one or more of communication modules 202-208 and external network 230. For example, aircraft communication channel manager 210 may instruct aircraft broadband over power line module 202 to establish an off-board broadband over power line communication channel with gate broadband over power line module 212. In the same or another example, aircraft communication channel manager 210 may instruct aircraft Wi-Fi module 204 to establish an off-board Wi-Fi communication channel with Wi-Fi router 214, such as a router of the Gatelink system. Furthermore, aircraft communication channel manager 210 may instruct aircraft cellular module 206 to establish an off-board cellular communication channel with a cellular router 216, such as a router of a cell phone service provider. Finally, aircraft communication channel manager 210 may instruct aircraft Ethernet module 208 to establish an off-board Ethernet communication channel with an Ethernet router 218, which may be a router provided by the airport or airline. Each one of these external communication modules or routers, e.g., gate broadband over power line module 212, Wi-Fi router 214, cellular router 216, and Ethernet router 218, may be capable of establishing separate external communication channels with external network 230. In some embodiments, one or more of these external communication modules or routers, e.g., gate broadband over power line module 212, Wi-Fi router 214, cellular router 216, and Ethernet router 218, may not be available and corresponding off-board communication channels and external communication channels cannot be established. Furthermore, even if one of these external communication modules or routers is available, aircraft communication channel manager 210 may choose not to use the corresponding communication channels because of various parameters associated with these communication channels, such as cost, security, availability, and speed.

As noted above, multiple communication channels may be established between an intermediate computer system, which is not a part of an aircraft. This intermediate computer system may be connected to the aircraft using a single communication channel. In the following example, the intermediate computer system is referred to as a gate. The gate is connected to aircraft using a broadband over power line communication channel. One having ordinary skills in the art would understand that the intermediate computer system may be provided at other locations (e.g., within an airport facility) and/or other types of communication channels may be used between the aircraft and the intermediate computer system.

Figure 3:
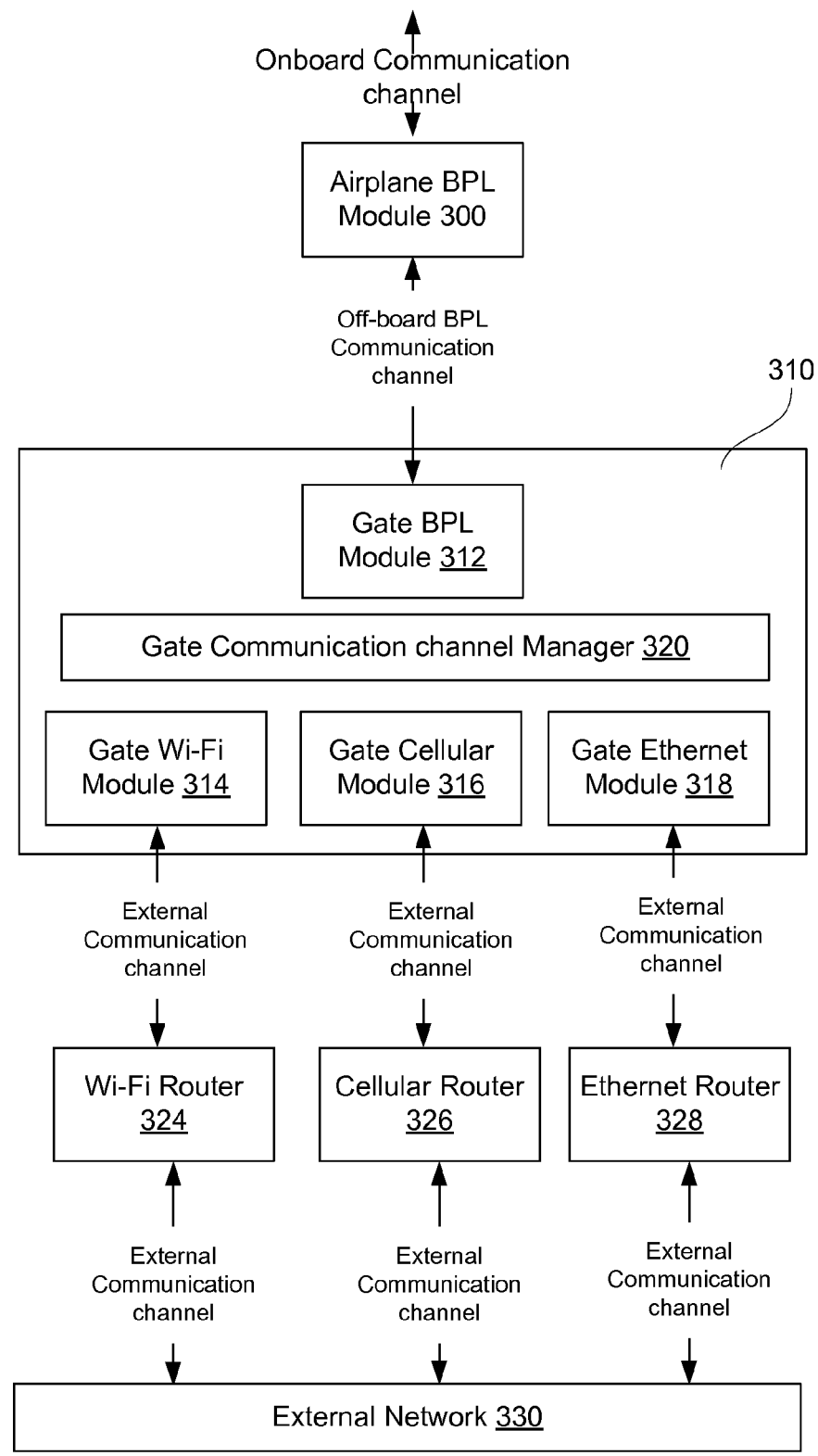
FIG. 3 is a schematic representation of different communications channels for data transmission between a gate and an external network, in accordance with some embodiments.

Specifically, FIG. 3 is a schematic representation of different communications channels for data transmission between a gate 310 and an external network 330, in accordance with some embodiments. Gate 310 includes a gate broadband over power line module 312 for establishing an off-board broadband over power line communication channel with airplane broadband over power line module 300 as described above. Gate 310 may include one or more other communication modules, such as gate Wi-Fi module 314, gate cellular module 316, and gate Ethernet module 318. These gate communication modules should be distinguished from aircraft communication modules that have a similar name, e.g., a gate Wi-Fi module is different from an aircraft Wi-Fi module. FIG. 3 illustrates three gate communication modules other than gate broadband over power line communication module 312. However, fewer or more communication modules may be provided on aircraft 200.

Gate 310 may also include a gate communication channel manager 320, which is configured to initiate and control data transmission between one or more of communication modules 314-318 and external network 330. For example, gate communication channel manager 320 may instruct gate Wi-Fi module 314 to form an external Wi-Fi communication channel with Wi-Fi router 324, such as a router of the Gatelink system. Furthermore, gate communication channel manager 320 may instruct gate cellular module 316 to form an external cellular communication channel with a cellular router 326, such as a router of a cell phone service provider. Finally, gate communication channel manager 320 may instruct gate Ethernet module 318 to form an external Ethernet communication channel with an Ethernet router 318, which may be a router provided by the airport, airline, or some third party (e.g., a communication company). These external communication routers may be the same or similar to the routers described above with reference to FIG. 2, i.e., Wi-Fi router 214, cellular router 216, and Ethernet router 218. In some embodiments, one or more of these external communication routers may not be available and corresponding external communication channels cannot be established. Furthermore, even if one of these external communication routers is available, gate communication channel manager 320 may choose not to use the corresponding communication channels because of various parameters associated with these communication channels, such as cost, security, availability, and speed. In some embodiments, the same external communication router may be used directly by the aircraft and separately by the gate to transmit separate data streams from the same aircraft. Some of these features are further described below with reference to FIG. 4.

Aircraft communication channel manager 210 of aircraft 200 illustrated in FIG. 2 or gate communication channel manager 320 of gate 310 illustrated in FIG. 3 can be configured to identify two or more communication channels established by available communication modules, such as the broadband over power line module, Ethernet communication module, and/or one or more wireless communication module. These two or more communication channels are available for terrestrial data transmission between the aircraft and the external network. Aircraft communication channel manager 210 or gate communication channel manager 320 may be also configured to allocate each of the two or more communication channels to data domains to be transmitted between the aircraft and the external network based on the channel security level of each communication channel. This function of aircraft communication channel manager 210 or gate communication channel manager 320 will now be further described below with reference to FIG. 4.

Examples of Data Transmission Methods

Figure 4:
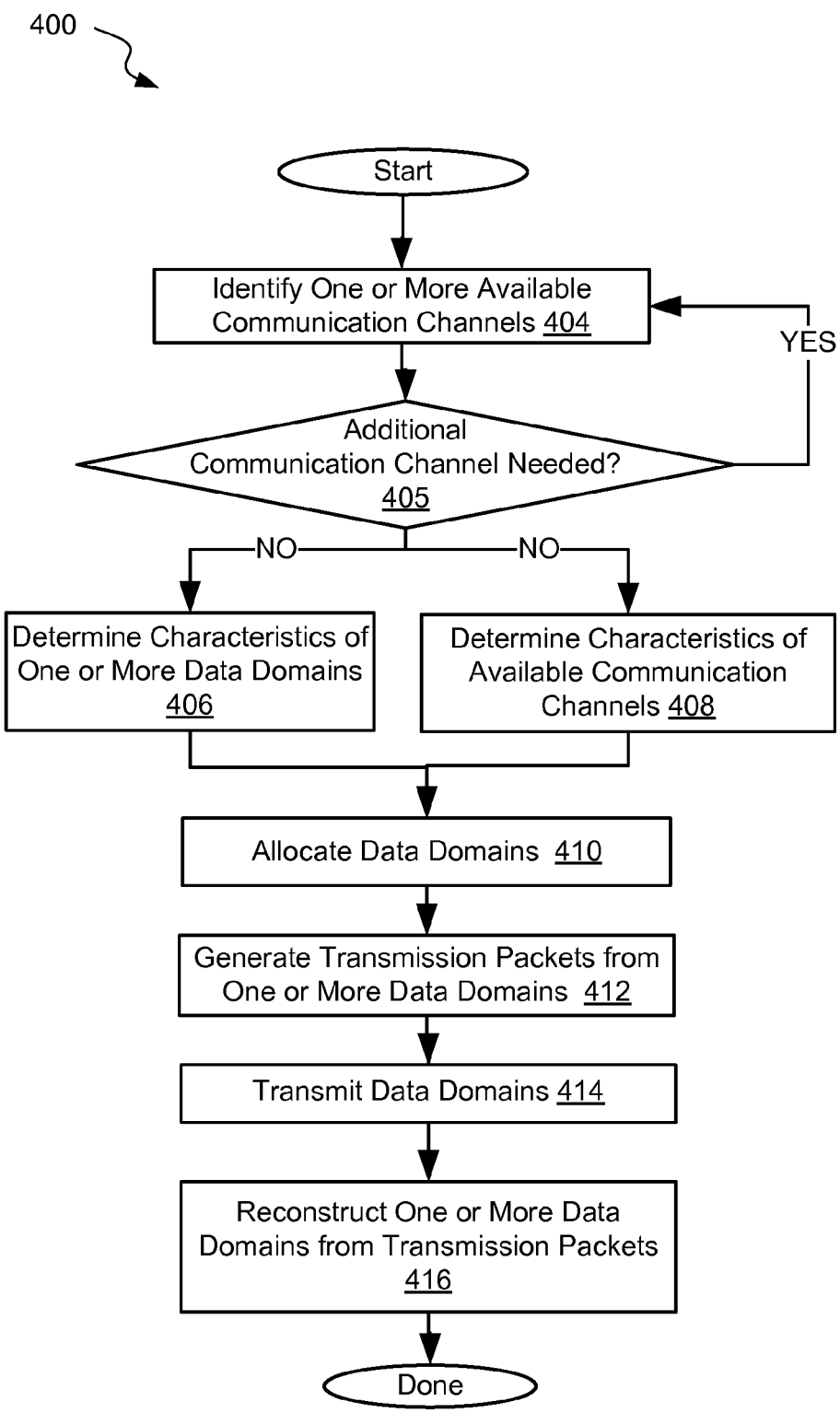
FIG. 4 is a process flowchart corresponding to a method for terrestrial data transmission between an aircraft and an external network that involves allocating data domains based on security levels of different communication channels, in accordance with some embodiments.

FIG. 4 is a process flowchart corresponding to a method 400 for data transmission between an aircraft and an external network, in accordance with some embodiments. The process flowchart illustrates various operations, some of which may be optional, as further described below. For example, operations 412 and 416 may not be performed. Furthermore, the order of these operations may not be the same as illustrated in the flowchart. For example, operation 406 may be performed before operation 404.

In some embodiments, method 400 may involves using an aircraft and an external network. Various examples of aircraft and external networks are described elsewhere in this document, such as with reference to FIG. 1 or FIG. 6. The aircraft and/or the external network may include one or more computer systems, some examples of which are described below with reference to FIG. 7. The computer system may be configured to perform operation of an aircraft communication channel manager or be a communication channel manager, some examples of which are described above with reference to FIGS. 2 and 3.

During method 400, the aircraft may be on the ground, such as parked by the gate or some other location at an airport. Depending on the location of the aircraft, different communication channels may be available. For example, when the aircraft is parked at the gate, it may be connected to a power cable and may be able to establish one or more broadband over power line communication channels through this power cable. In some embodiments, multiple broadband over power line communication channels (e.g., two or three) may be established through the same power cable Furthermore, an Ethernet communication channel may be available at the gate. Availability of wireless communication channels, such as one or more Wi-Fi communication channels and/or one or more cellular communication channels may be less restrictive of the aircraft location and may be available, for example, immediately after landing of the aircraft and while the aircraft is being taxied to the gate. It should be noted that operations of method 400 may be repeated multiple times, for example, when new communication channels become available or when previously available communication channels become unavailable. For example, a method may be first executed after the aircraft has landed and while it is being taxied to the gate and then repeated while or after the aircraft has been connected to the gate. In some embodiments, some operations may be performed before landing and/or after takeoff. Furthermore, some operations may be performed while an aircraft is being taxied to the gate after its landing and/or from the gate prior to its takeoff.

Method 400 may proceed with operation 404, during which one or more communication channels available for terrestrial data transmission between the aircraft and the external network are identified. In some embodiments, two or more communication channels are identified during operation 404. Furthermore, operation 404 may be repeated as indicated by decision block 405 if insufficient number of communication channels is identified. In some embodiments, operation 404 is repeated after completing operation 408, during which characteristics of available communication channels are determined. Operation 404 may be even repeated after performing operation 410, during which a partial allocation of the communication channels is performed. For example, it may be determined during operation 408 and/or during operation 410 that the initially identified communication channels are insufficient for transmission all data domains that need to be transmitted. For example, the initially identified communication channels may not have an adequate security level, speed, and/or other characteristics. In this case additional communication channels may be searched for when operation 404 is repeated. If operation 404 is repeated, then operation 408 and/or operation 410 may be repeated for additionally identified communication channels.

During operation 404, the aircraft or, more specifically, the communication channel manager may scan for available communication channels. For example, the communication channel manager may look for available Wi-Fi networks and/or available cellular networks. Availability of broadband over power line communication channel may be checked after connecting to the power line. In some embodiments, availability of networks may be determined based on the identification of the airport. For example, an aircraft or, more specifically, its communication channel manager may have a database of available communication channels at certain airports to which this aircraft flies. Furthermore, as described above with reference to FIG. 3, in some embodiments, the communication channel manager may be provided at the airport rather than on the aircraft.

In some embodiments, different types of communication channels may be used. For example, one channel may be a broadband over power line channel, while another channel may be a wireless channel. In some embodiments, both channels may be wireless channels but still be different types. For example, one channel may be a Wi-Fi channel, while another may be a cellular channel. In some embodiments, multiple broadband over power line channels and/or multiple wireless channels may be identified as available for terrestrial data transmission between the aircraft and the external network. Overall, the two or more available communication channels may include at least one of a broadband over power line communication channel, a Wi-Fi communication channel, a Wi-Gig communication channel, a WiMAX communication channel, a White Space communication channel, a free space laser communication, a cellular communication channel, a satellite communication channel, or an Ethernet communication channel.

In some embodiments, method 400 may involve operation 406, during which transmission characteristics of one or more data domains (to be transmitted between the aircraft and the external network) are determined. These transmission characteristics may be referred to as data domain transmission characteristics to distinguish them from transmission characteristics of communication channels, which may be referred to as communication channel transmission characteristics. Examples of data domain transmission characteristics may include security level, data size, data type, criticality and priority of data in the data domain, and Quality of Service for the data domain including the delivery and latency. For example, the aircraft control domain may have the highest security level followed by the aircraft information system domain and then the passenger information and entertainment system domain. At the same time, the passenger information and entertainment system domain may be the largest in size. These data domain transmission characteristics may be used during operation 410 to allocate data domains to different communication channels and, in some embodiments, during other operations. While the security level of the data domain may be one of the main factors during this allocation operation, other data domain transmission characteristics may be considered as well.

In some embodiments, method 400 may involve operation 408, during which transmission characteristics of one or more communication channels (to be used for transmission of data domains between the aircraft and the external network) are determined. Examples of communication channel transmission characteristics may include security level, transmission speed and throughput, transmission cost, available duration, and transmission latency. For example, a broadband over power line communication channel may have a higher security level and higher transmission speed than a wireless communication channel. Some wireless communication channels, such as Wi-Fi channels, may have a lower cost than other wireless communication channel, such as cellular communication channels. In some embodiments, the security level may be determined based on the geographical location of this particular channel, type of the channel, previous security breaches associated with this location or channel, configuration of external networks, and other like factors. Certain communication channels may be deemed unavailable for any terrestrial data transmission between the aircraft and the external network based on their security level determined during this operation. These channel communication transmission characteristics may be used during operation 410 to allocate data domains to different communication channels and, in some embodiments, during other operations.

Method 400 involves allocating data domains to be transmitted between the aircraft and the external network to each of the two or more communication channels during operation 410. The data domains may be allocated based on at least the channel security level of each available communication channel. The channel security level may be determined during operation 408. For example, each data domain may have a certain minimum requirement for the channel security. These requirements may vary among different data domains. The communication channel allocated to transmit a particular domain may need to meet or exceed the requirement for channel security for that domain.

Other data domain transmission characteristics and/or communication channel transmission characteristics may be considered during operation 410. For example, the communication channel manager may take all available characteristics and generate a set of transmission instructions indicating how each communication channel will be used to transfer data domains.

In some embodiments, each data domain may be allocated for transmission at least partially through one allocated communication channel. In some embodiments, at least one data domain is allocated entirely to one communication channel. In other words, this data domain will be transmitted using only this communication channel. Alternatively, a data domain may be allocated to multiple communication channels. For example, a data domain may be parsed into transmission packets during operation 412. Some of these packets may be then transmitted through one communication channel, while other packets may be transmitted through another communication channel. The generation of packets and allocation of packets to particular data domains may be performed during operation 410. In this case, operation 410 may also involve generating instructions for reconstructing the data domain after the packets of this data domain have been transmitted using different communication channels. These instructions are used during operation 416 to reconstruct the data domain by an external network (for data packets transmitted from an aircraft) or by an aircraft (for data packets transmitted from an external network).

In some embodiments, allocating operation 410 is also based on one or more characteristics of the available communication channels in addition to the channel security level. These additional characteristics may include transmission cost of each available communication channel, transmission speed of each available communication channel, and available duration of each available communication channel. The security level and these other characteristics may be determined during operation 408.

In some embodiments, allocating operation 410 is performed automatically. For example, a communication channel manager may perform operation 410 based on characteristics of the data domain and/or characteristics of the communication channels. It should be noted that the communication channel manager may perform operation 410 for data domains to be transmitted from the aircraft to one or more external networks and for data domains to be transmitted from the one or more external networks to the aircraft. For example, prior to operation 410, the communication channel manager may receive information from the one or more external networks about the latter set of data domains.

Method 400 may also involve transmitting the data domains between the aircraft and the external network using the allocated communication channels during operation 414. The data domains may be transmitted from the aircraft to the external network and/or from the external network to the aircraft. The communication channels allocated during operation 410 are used for transmitting the data domains.

In some embodiments (when at least one data domain has been parsed into packets and these packets have been transmitted using different communication channels), method 400 also involves reconstructing the transmitted packets into one or more data domains. As described above, instructions for reconstructing the packets may be generated during operation 410. These instructions may be transmitted through one of the channels used for transmission of the data packets or a separate communication channel.

A few examples of method 400 will now be described to better illustrate various features of this method. In one example, two available communication channels are identified during operation 404. One may be a wired communication channel having a high security level (e.g., a broadband over power line communication channel), while the other one may be a wireless communication having a medium level of security (e.g., a cellular communication channel). The security levels of these channels may be identified during operation 408. Data domains for transmission may fall into a high security category, a medium security category, and a low security category. These categories may be identified during operation 406. During operation 410, the wired communication channel having the high security level may be allocated to transmit the high security data domains, while the wireless communication channel having the medium security level may be allocated to transmit the medium and low security data domains.

In another example, two available communication channels are identified during operation 404. Both may be wireless communication channels having a medium level of security (e.g., two different cellular communication channels provided by different cellular companies). The security levels of these communication channels may be identified during operation 408. Data domains for transmission may again fall into a high security category, a medium security category, and a low security category. These categories may be identified during operation 406. During operation 410, the first wireless communication channel may be allocated to transmit a portion the high security data domains, while the other wireless communication channel may be allocated to transmit all of the data domains, including a remaining portion of the high security data domains. Specifically, the high security data domains may be parsed into data packets, and some data packets may be transmitted using the first wireless communication channel, while the remaining data packets may be transmitted using the second wireless communication channel. Therefore, if one of these wireless communication channels is compromised (but not the other one), access to all high security data domains will not be available. The second wireless communication channel may be allocated to transmit the medium and low security data domains because of its lower cost, higher speed, and/or other characteristics in comparison to the first wireless communication channel.

In yet another example, three available communication channels may be identified during operation 404. All three are wireless communication channels. One may have a high security level (e.g., a satellite communication channel), while the other two may have a low level of security (e.g., two different cellular communication channels provided by different cellular companies). The security levels of these channels may be identified during operation 408. Data domains for transmission may again fall into a high security category, a medium security category, and a low security category. These categories may be identified during operation 406. During operation 410, the high security wireless communication channel may be allocated to transmit the high security data domains. However, it will not be allocated to transmit any other data domains because, for example, the transmission costs associated with this high security wireless communication channel. Both of the low security wireless communication channels may be allocated to transmit the medium security data domains. These data domains may be, for example, parsed into data packets and some data packets may be transmitted using one of these low security wireless communication channel and the remaining data packets may be transmitted using the other one of these two channels. Therefore, if one of these wireless communication channels is compromised (but not the other one), access to all high security data domains will not be available. One of these low security wireless communication channel may be allocated to transmit all low security data domains because of its lower cost, higher speed, and/or other characteristics in comparison to the other one of these two channels.

Examples of Aircraft

Figure 5:
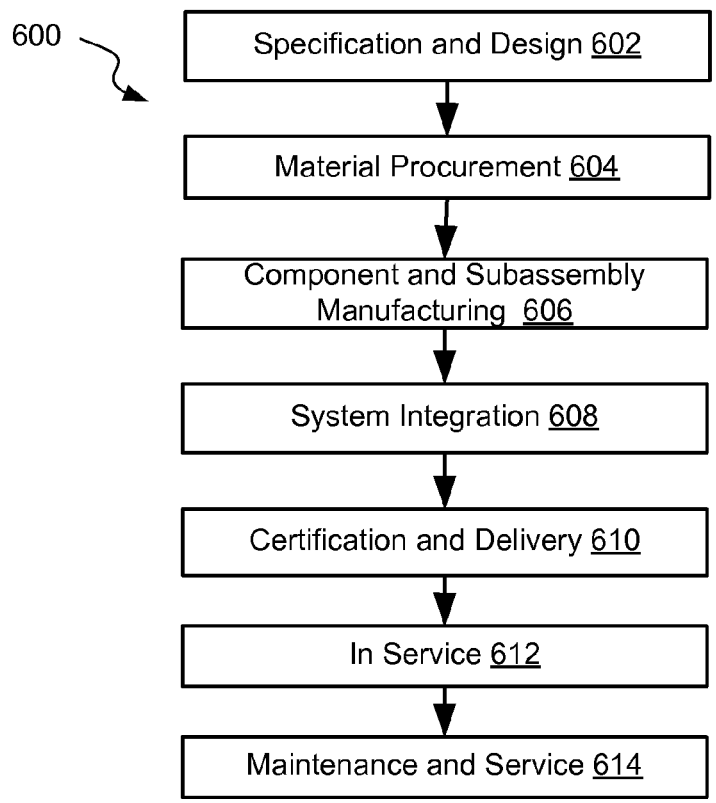
FIG. 5 is a process flowchart reflecting key operations in the life cycle of an aircraft from early stages of manufacturing and to entering service, in accordance with some embodiments.

An aircraft manufacturing and service method 600 shown in FIG. 5 and an aircraft 630 shown in FIG. 6 will now be described to better illustrate various features of processes and systems presented herein. During pre-production, aircraft manufacturing and service method 600 may include specification and design 602 of aircraft 630 and material procurement 604. The production phase involves component and subassembly manufacturing 606 and system integration 608 of aircraft 630. Thereafter, aircraft 630 may go through certification and delivery 610 in order to be placed in service 612. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

Figure 6:
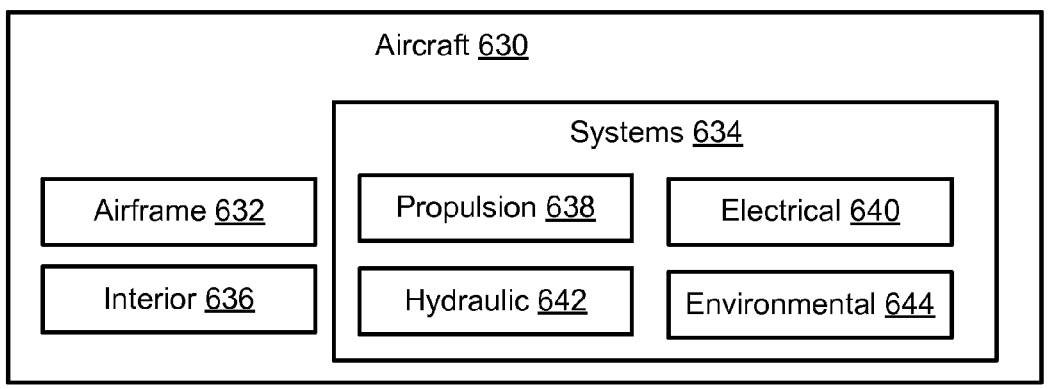
FIG. 6 is a block diagram illustrating various key components of an aircraft, in accordance with some embodiments.

As shown in FIG. 6, aircraft 630 produced by aircraft manufacturing and service method 600 may include airframe 632, interior 636, and multiple systems 634 and interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 600. For example, without limitation, components or subassemblies corresponding to component and subassembly manufacturing 606 may be fabricated or manufactured in a manner similar to components or subassemblies produced while aircraft 630 is in service.

Also, one or more apparatus embodiments, method embodiments, or a combination thereof may be utilized during component and subassembly manufacturing 606 and system integration 608, for example, without limitation, by substantially expediting assembly of or reducing the cost of aircraft 630. Similarly, one or more of apparatus embodiments, method embodiments, or a combination thereof may be utilized while aircraft 630 is in service, for example, without limitation, to maintenance and service 614 may be used during system integration 608 and/or maintenance and service 614 to determine whether parts may be connected and/or mated to each other.

Examples of Controller Computer Systems

Figure 7:
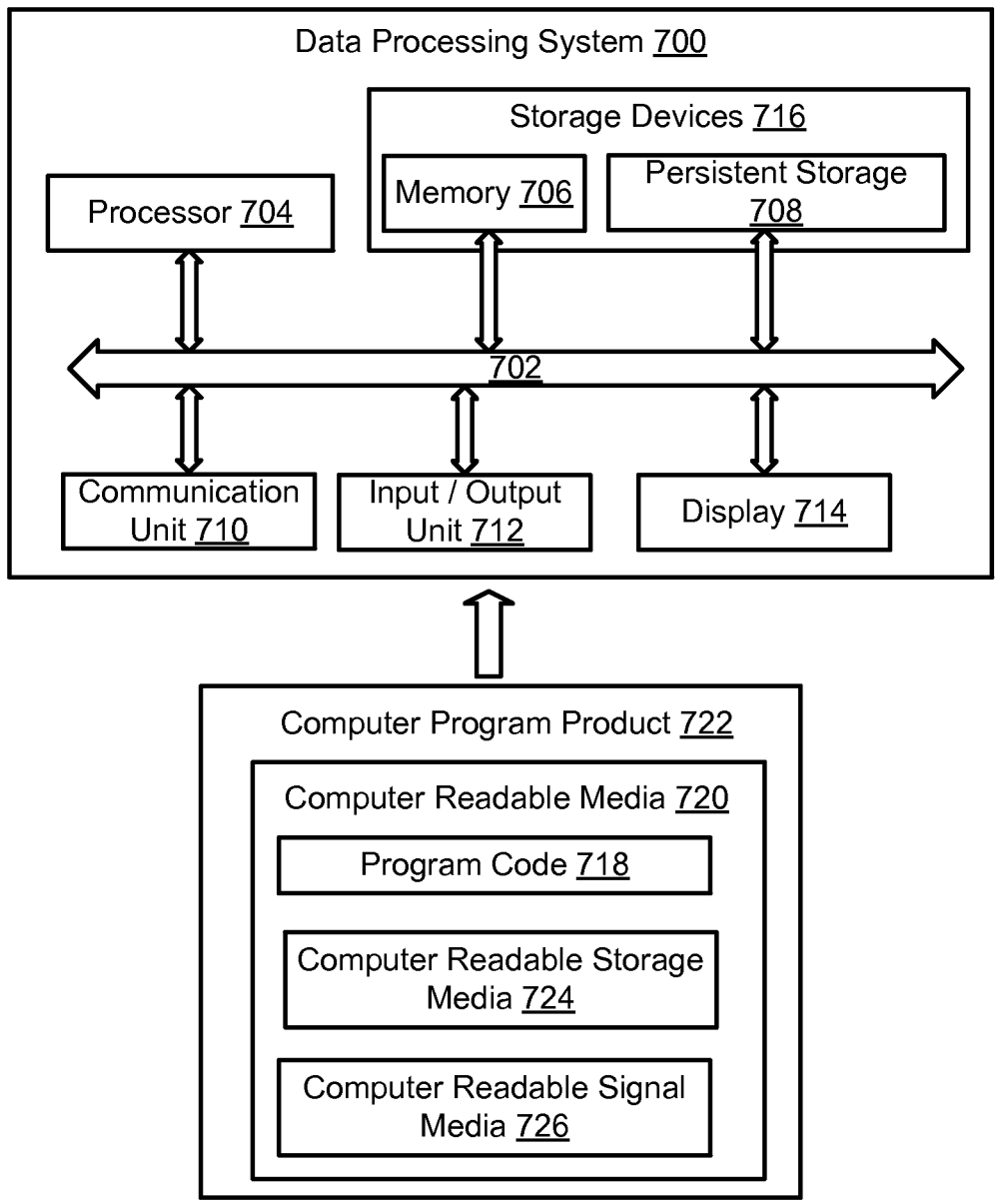
FIG. 7 is a block diagram illustrating a data processing system, in accordance with some embodiments.

Turning now to FIG. 7, an illustration of a data processing system 700 is depicted in accordance with some embodiments. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transmitted to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transmitted to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method for terrestrial data transmission between an aircraft and an external network, the method comprising:
    identifying two or more communication channels available for terrestrial data transmission between the aircraft and the external network; and
    allocating data domains to be transmitted between the aircraft and the external network to each of the two or more communication channels based on a channel security level of each of the two or more communication channels,
        wherein at least two of the two or more communication channels are allocated to transmit the same data domain of the data domains; and
    generating instructions for reconstructing the same data domain after the same data domain is transmitted using the at least two of the two or more communication channels.

2. The method of claim 1, further comprising determining the channel security level of each of the two or more communication channels available for terrestrial data transmission between the aircraft and the external network.

3. The method of claim 1, wherein at least two of the two or more communication channels are different types of communication channels.

4. The method of claim 3, wherein one of the at least two of the two or more communication channels is a broadband over power line communication channel and another one of the at least two of the two or more communication channels is a wireless communication channel.

5. The method of claim 1, wherein the two or more communication channels comprises at least one of a broadband over power line communication channel, a Wi-Fi communication channel, a Wi-Gig communication channel, a WiMAX communication channel, a White Space communication channel, a free space laser communication, a cellular communication channel, a satellite communication channel, or an Ethernet communication channel.

6. The method of claim 1, further comprising transmitting the data domains between the aircraft and the external network using the allocated communication channels of the two or more communication channels.

7. The method of claim 1, wherein at least one of the two or more communication channels is allocated to transmit an entire data domain of the data domains.

8. The method of claim 1, wherein allocating each of the two or more communication channels to the data domains to be transmitted between the aircraft and the external network is further performed based on one or more parameters selected from the group consisting of (a) transmission cost of each of the two or more communication channels, (b) transmission speed of each of the two or more communication channels, and (c) available duration of each of the two or more communication channels.

9. The method of claim 1, wherein allocating each of the two or more communication channels to the data domains to be transmitted between the aircraft and the external network is performed automatically.

10. The method of claim 1, wherein identifying the two or more communication channels available for terrestrial data transmission between the aircraft and the external network and allocating each of the two or more communication channels to the data domains to be transmitted between the aircraft and the external network are performed by a communication channel manager disposed on the aircraft.

11. The method of claim 1, wherein the data domains comprises an aircraft control domain, an aircraft information system domain, and a passenger information and entertainment systems domain.

12. The method of claim 1, wherein at least one of the two or more communication channels has a different channel security level than at least another one of the two or more communication channels.

13. The method of claim 1, further comprising determining transmission characteristics of each of the data domains to be transmitted between the aircraft and the external network, the transmission characteristics comprise at least one of a data security level or a data type.

14. A system for terrestrial data transmission between an aircraft and an external network, the system comprising:
    a broadband over power line module configured to transmit data to and from the external network through an electrical power cable connected to the aircraft and a gate;
    at least one wireless communication module configured to wirelessly transmit data to and from the external network; and
    a communication channel manager configured to initiate and control data transmission between the broadband over power line module and the external network and between the at least one wireless communication module and the external network,
        the communication channel manager further configured to identify two or more communication channels established by the broadband over power line module and the at least one wireless communication module,
        wherein at least two of the two or more communication channels are allocated to transmit the same data domain of the data domains,
        the communication channel manager further configured to generate instructions for reconstructing the same data domain after the same data domain is transmitted using the at least two of the two or more communication channels,
        the two or more communication channels being available for terrestrial data transmission between the aircraft and the external network, the communication channel manager further configured to allocate each of the two or more communication channels to data domains to be transmitted between the aircraft and the external network based on a channel security level of each of the two or more communication channels,
    wherein the broadband over power line module, the at least one wireless communication module, and the communication channel manager are configured for fixed attaching to the aircraft.

15. The system of claim 14, wherein the broadband over power line module, the at least one wireless communication module, and the communication channel manager are integrated into a terrestrial off-board communication unit.

16. The system of claim 14, further comprising the aircraft and wherein the broadband over power line module, the at least one wireless communication module, and the communication channel manager are fixedly attached to the aircraft.

17. The system of claim 16, wherein the aircraft comprises an electrical power receptacle for connecting to the electrical power cable and wherein the electrical power receptacle is inductively coupled to the broadband over power line.

\* \* \* \* \*